United States Patent [19]

Fleckenstein et al.

[11] 4,290,451
[45] Sep. 22, 1981

[54] WATER CONDITIONING SYSTEM CONTROLS

[75] Inventors: Andrew Fleckenstein, Brookfield; Michael Mortl, Glendale, both of Wis.

[73] Assignee: L. W. Fleckenstein, Inc., Brookfield, Wis.

[21] Appl. No.: 89,450

[22] Filed: Oct. 30, 1979

[51] Int. Cl.³ .................. F16K 11/07; F16K 11/10
[52] U.S. Cl. .................. 137/624.15; 137/624.2; 137/625.29; 137/599.1; 210/139
[58] Field of Search ........... 137/624.18, 624.2, 624.13, 137/624.15, 625.29, 625.69, 599.1; 210/138, 139, 140

[56] References Cited

U.S. PATENT DOCUMENTS

| | | | |
|---|---|---|---|
| 3,441,047 | 4/1969 | Lyall | 137/624.2 X |
| 3,616,280 | 11/1971 | Fleckenstein | 137/625.69 X |
| 3,700,007 | 10/1972 | Sparling | 137/625.29 |
| 3,874,412 | 4/1975 | Fleckenstein | 137/625.29 X |

Primary Examiner—Alan Cohan
Attorney, Agent, or Firm—McWilliams, Mann & Zummer

[57] ABSTRACT

This invention relates to the controls for a water conditioning system with an operating valve having a simplified drive mechanism and a brine valve made from plastic materials and readily assembled for adaptability to softener systems of various sizes and having flexible coupling means which enable rigid plumbing parts to be connected with the plastic valve assembly.

3 Claims, 12 Drawing Figures

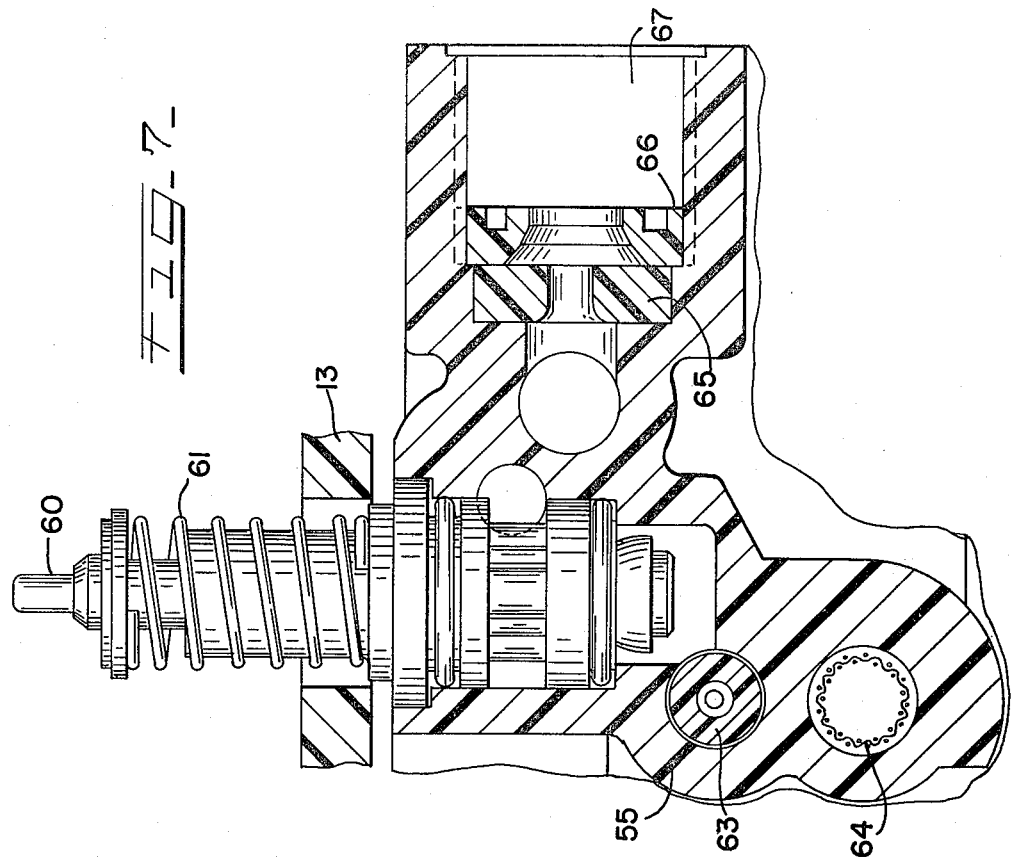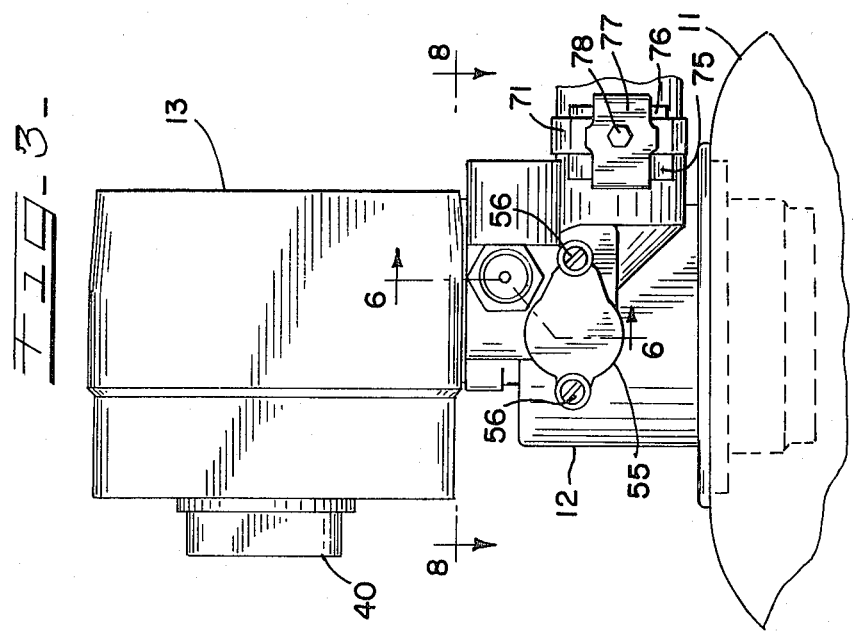

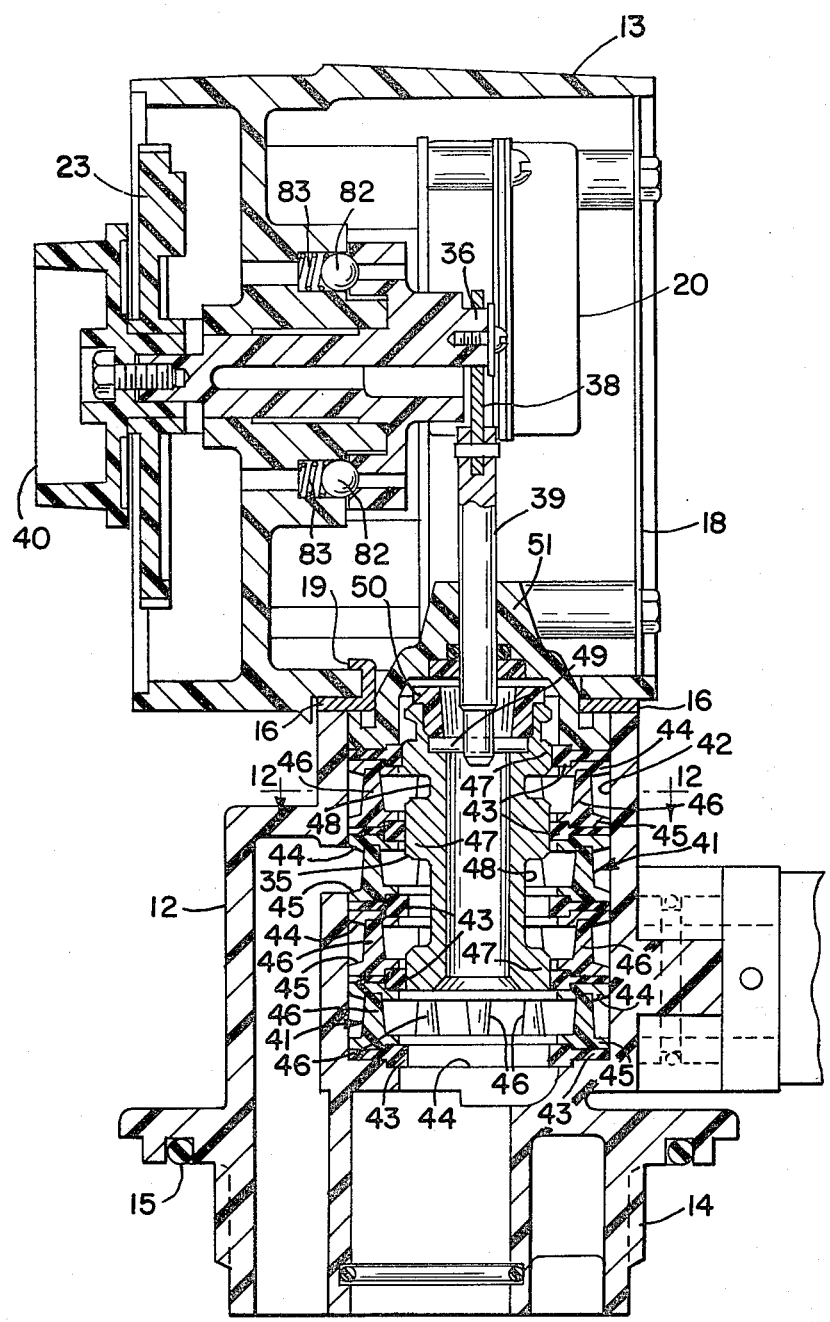

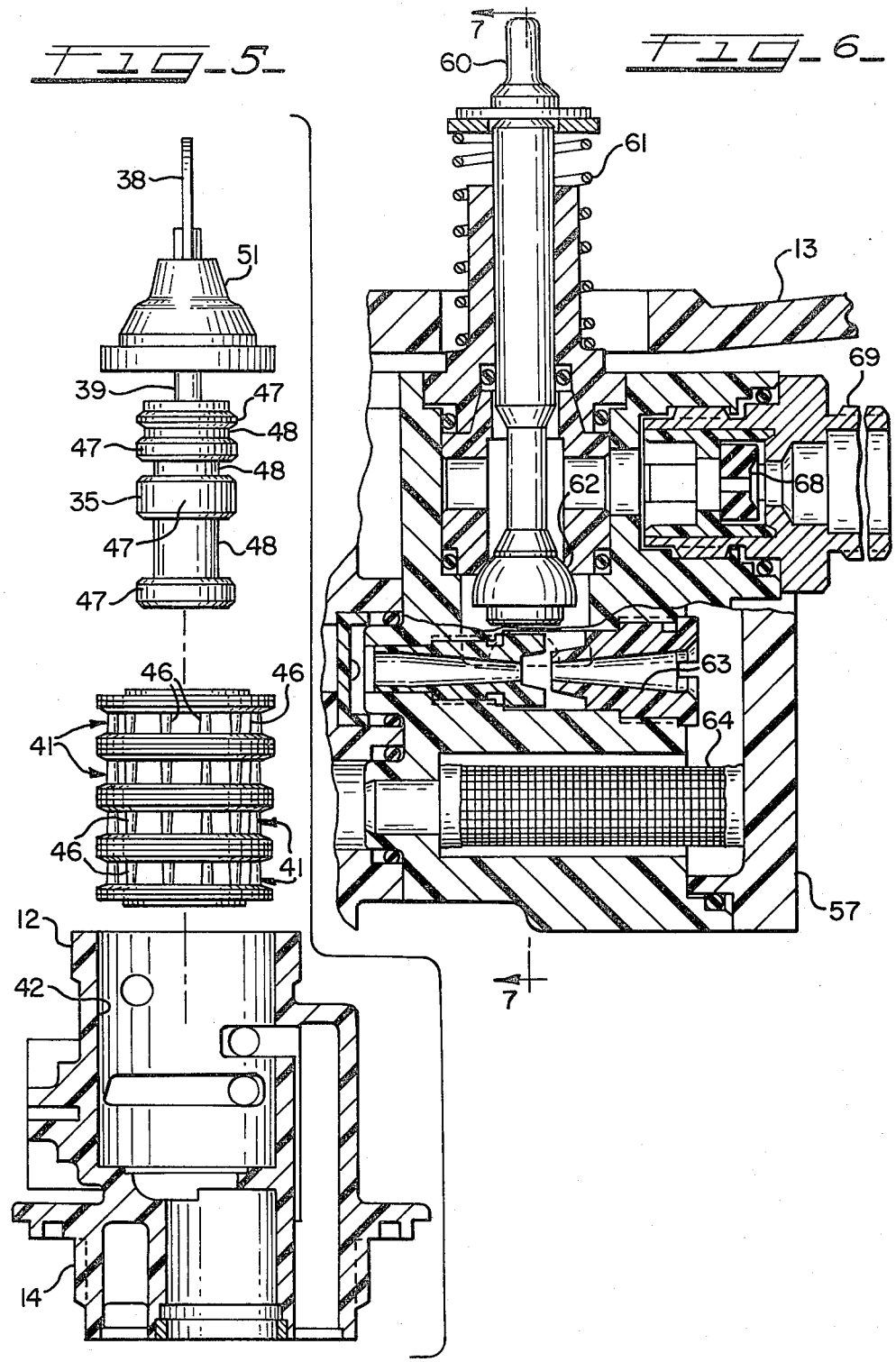

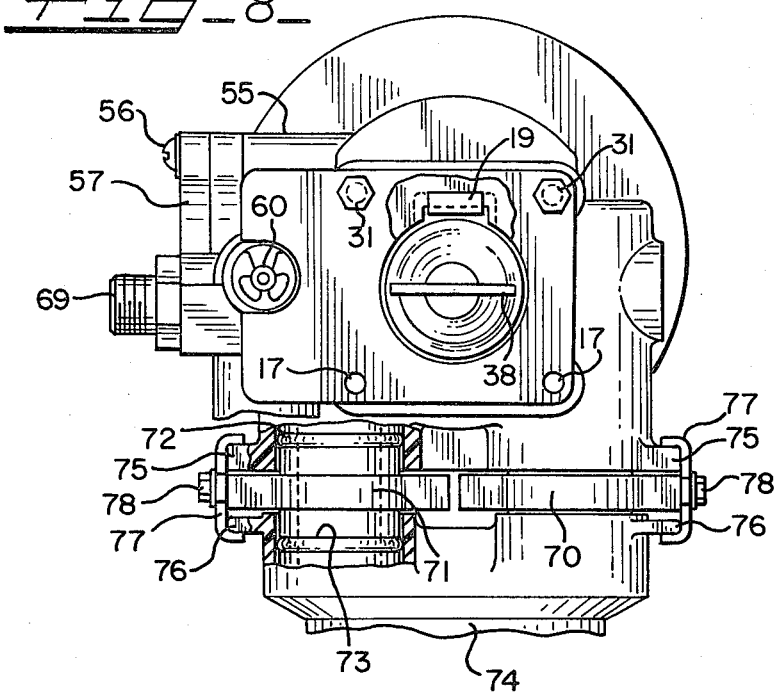
FIG_8_
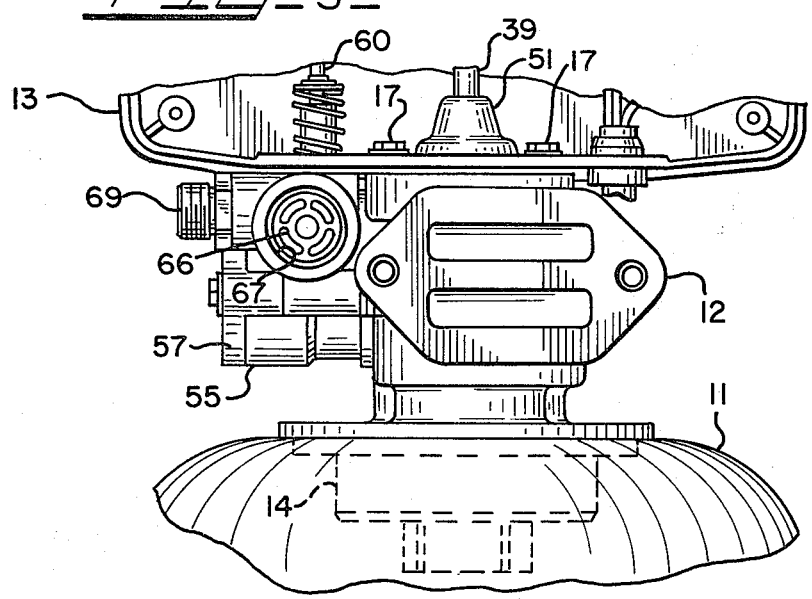
FIG_9_

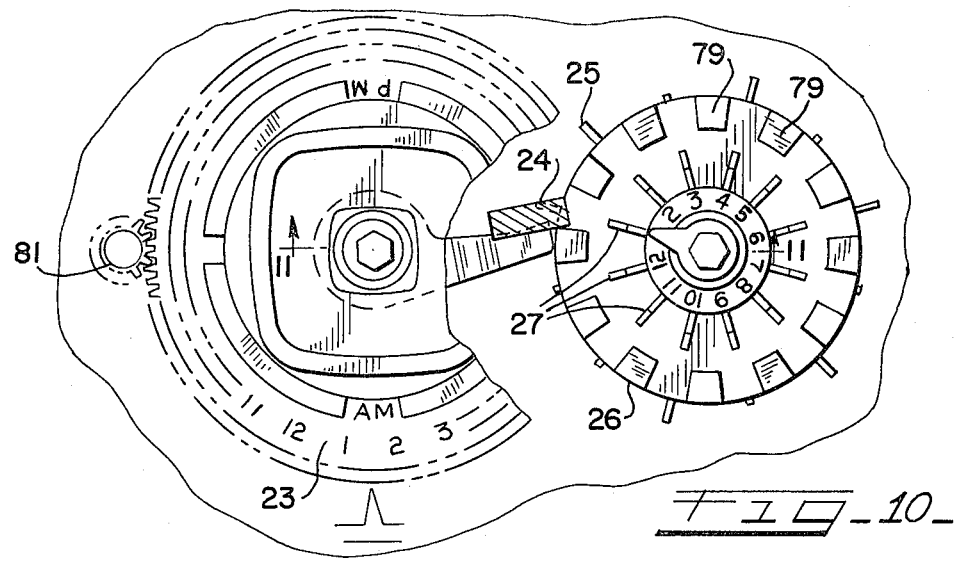
_Fig_10_
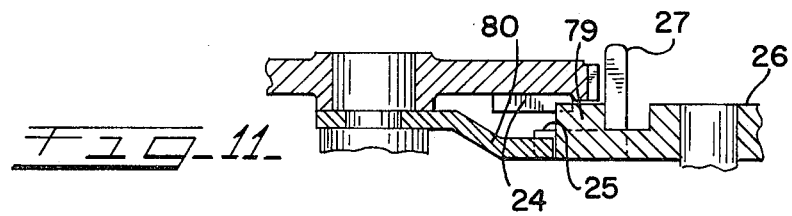
_Fig_11_
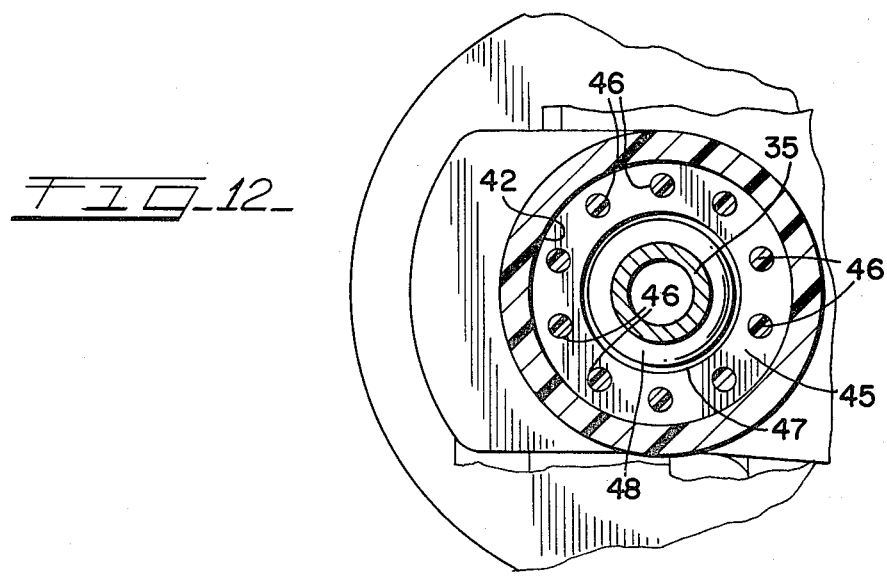
_Fig_12_

4,290,451

WATER CONDITIONING SYSTEM CONTROLS

BACKGROUND OF THE INVENTION

1. Field Of The Invention

This invention finds its background in the field related to resin systems pertaining to the conditioning of water to provide soft water in a household, or similar installations and primarily relates to the valves and controls used with such systems.

2. Description Of Prior Art

Prior controls for water softening systems utilized valves of rigid construction and rigidly mounted and the brine valve commonly has been incorporated integrally with the softener valve body and in order to select a softener valve for a particular system, or to adapt the valve to systems of varying size, or capacity, it was necessary to install the complete valve assembly of the size and capacity required with no provision for modification or adaptability of the valve to systems of different capacities.

SUMMARY OF THE INVENTION

The present invention initially provides a control valve of improved function utilizing a simplified piston drive incorporating a one way clutch for manual operation of the regenerating system. The control valve mechanism disposes with the multiplicity of levers used heretofore with rollers and moving plates to start the regeneration cycle and instead an arm has been provided on the drive shaft of the piston and extending to a position where it will be activated by a finger projecting from the skipper wheel. A brine valve module is provided for assembly with the softener valve whereby the control can readily be adapted to softener systems of various sizes, or capacities.

A supply of brine valve modules and the softener valve enable a dealer to provide controls readily for any size installation or enable an existing system to be modified as the need may arise. The plumbing connections for the softener valve will incorporate flexible fittings which enable rigid plumbing parts attached to the plastic valve body to have some "give" in order to relieve the plastic component of any undue strain.

OBJECTS OF THE INVENTION

The primary purpose of this invention is to provide controls for a water conditioning system incorporating a timer control having simplified operation and a softener valve body constructed of plastic with a brine valve module assembled thereto.

The principal object of the invention is the provision of a softener valve for a water conditioning system having a separate brine valve module assembled thereto and interchangeable.

An important object of the invention is to provide a timer control for a water conditioning system having a rigidly mounted driving motor and a one way clutch for manual operation of a cycle of operation of the system including a piston actuated by the timer.

Another object of the invention is the provision of a timer control for a water conditioning system having a driving motor and an extension arm on the piston shaft activated by a projection on a skipper wheel.

A further object of the invention is to provide a softener valve for a water conditioning system having fittings which provide flexibility for relieving undue strain between connected elements.

A still further object of the invention is to provide a water conditioning system including a softener valve having a separate brine valve which may be assembled with a softener valve body made from a plastic material or assembled with a softener valve body of metal.

Still another object of the invention is the provision of a water conditioning system including a softener valve containing the required passages and ports internally, eliminating the need for an external plumbing.

DESCRIPTION OF THE DRAWINGS

The foregoing and other and more specific objects of the invention are attained by the controls and valves illustrated in the accompanying drawings wherein

FIG. 3 also is a detail view with the timer illustrated in side elevation and the softener valve therebelow also in side elevation;

FIG. 4 is a vertical sectional view through the timer control and softener valve taken on the line 4—4 of FIG. 1;

FIG. 5 is a detail view showing parts of the softener valve in exploded relationship;

FIG. 6 is a detail sectional view through the softener valve taken on the line 6—6 of FIG. 3 showing its relationship to the timer control;

FIG. 7 also is a detail sectional view through the softener valve taken on the line 7—7 of FIG. 6;

FIG. 8 is a plan view of the softener valve from the plane indicated at the line 8—8 in FIG. 3;

FIG. 9 is a detail elevational view of the softener valve installation between the timer control and the mineral treatment tank;

FIG. 10 is a fragmentary detail view of the timer mechanism with parts broken away to show the engagement of a lug on the rear of the time dial with a projection on the skipper wheel to start the regeneration cycle;

FIG. 11 is a sectional view taken on the line 11—11 of FIG. 10 showing the details of the engagement illustrated in that figure; and FIG. 12 is a horizontal sectional view through the softener valve taken on the line 12—12 of FIG. 4 a structural detail of the spacer rings in the valve.

DESCRIPTION OF PREFERRED EMBODIMENT

Figure 1:
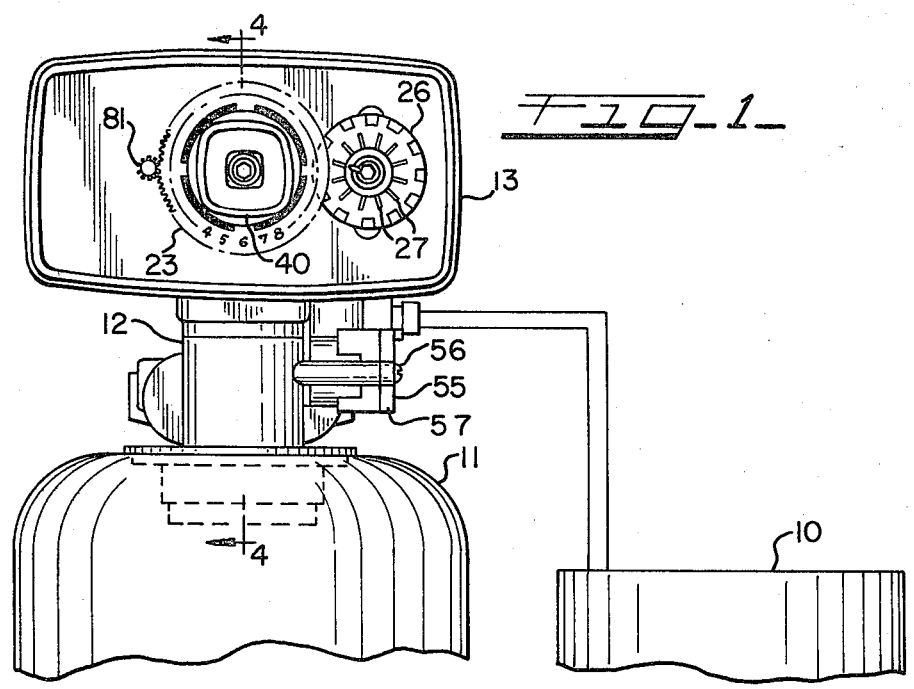
FIG. 1 is a fragmentary but general view of a water conditioning system incorporating the timer control and associated softener valve of this invention, showing the timer from the front side thereof.

As shown in FIG. 1 of the drawings, this invention is used in association with a water conditioning system including a brine tank 10 and a treatment tank 11 with the softener valve 12 and timer control 13 operatively related to each other and mounted on top of the treatment tank 11 with suitable piping connections in accordance with the required circulation of fresh incoming hard water and brine solution through the control valve and softened water to a household plumbing system all as well known in this art.

Figure 2:
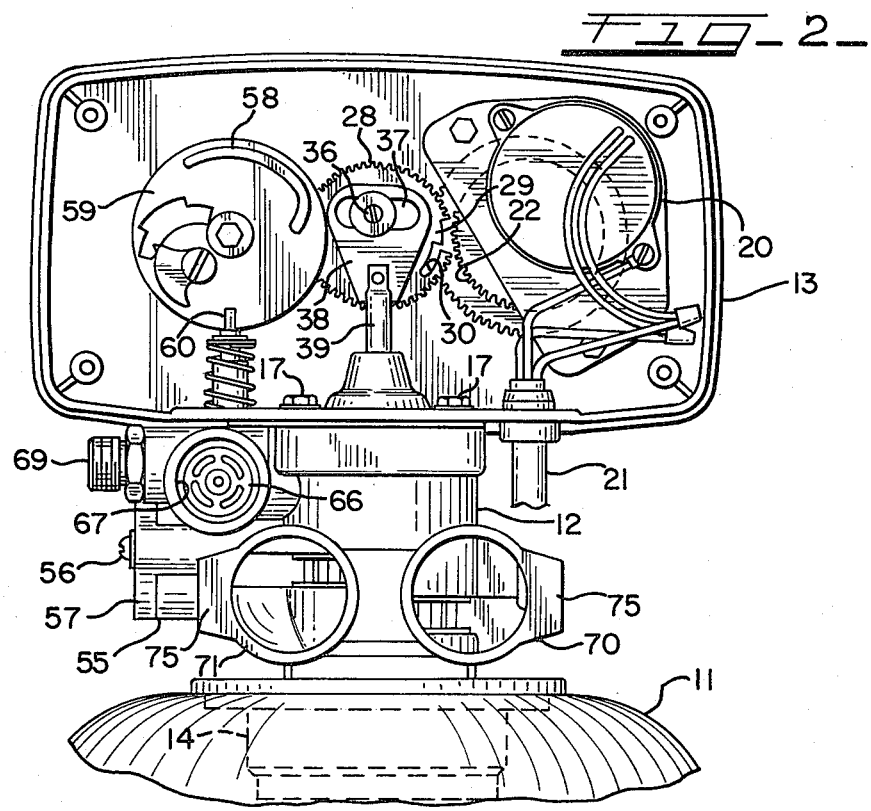
FIG. 2 is a detail view to somewhat larger scale showing the timer control mechanism from the back side with the back cover removed and with the softener valve disposed below the timer.

The softener valve 12 preferably is made from a suitable plastic material and includes a threaded fitting 14 screwed into a suitable fitting in the treatment tank for mounting the valve on top of the tank 11 with an O-ring sealing member between the tank top and a collar flange on the valve body, as best indicated in FIG. 4. The timer control 13 is mounted on top of the softener valve 12 on an intermediate plate 16 as shown in FIG. 4. At the back side of the control 13 it is secured by two stud bolts 17 (see FIG. 2) which extend through the bottom wall of the timer control and through the plate 16 for threading into the softener valve body 12.

The bolts 17 are accessible when the metal rear cover plate 18 of the timer housing is removed, but when the timer housing 13 is mounted on the softener valve 12 the front side becomes inaccessible for the purpose of fastening down this side of the housing. Accordingly, the intermediate plate 16 is provided with an upstanding and forwardly directed hooklike projection 19 for engaging over the bottom wall of the timer housing 13 and thus secure this side to the valve housing 12. The plate 16 is secured to the timer housing 13 at the front side by recessed stud bolts 31 (see FIG. 8) threaded into the housing 13 and installed prior to assembly of the timer housing onto the softener valve.

The timer control 13 incorporates a rigidly mounted electric motor 20 operated from house current obtained through suitable wiring including lead-in 21. The motor 20 is a continuously operating motor having a drive gear 81 which drives a twenty four hour time dial 23. Every twenty four hours at a pre-set time, usually in the early A.M. hours, a projecting lug 24 on the rear side of the time dial 23 is adapted to engage a projected lug 79 on a skipper wheel 26 which is adapted to drive the lug through thirty degrees of rotation.

There are twelve of the trip fingers 25 equally spaced around the skipper wheel and are each projected, or retracted, by means of an integral finger piece 27, so that only one trip finger 25 is projected normally for engagement with the actuator arm 80. If one of the trip fingers is not projected the actuator arm 80 will not be tripped but with one of the fingers 25 extended it will engage the actuator arm 80 to start the complete cycle of regeneration. When the arm 80 and lug 24 are activated a notched gear 28 is brought into operative engagement with the driving gears to effect the start-up of the regeneration cycle.

It should be noted that the first four teeth on the gear 28 after the notch 29 are cantilevered, as at 30, to afford some displacement of the teeth radially during initial engagement with the driving gear because of the difference in speed between the two gears but once adequate engagement of the gears is achieved the drive gear 22, of course, takes over and rotates the gear 28 to start the complete regeneration cycle of the water softening system and upon completion of the regeneration cycle the notched gear 28 arrives at the neutral position where the notch 29 is out of engagement with the teeth on the driving gear and secured in the neutral position by detent balls 82 and springs 83.

The operating piston 35 in the softener valve 12 is actuated by the gear 28 and for this purpose the gear is provided with a rearwardly directed offcenter lug 36 that rotates with the gear and which is entered into a horizontally slotted opening 37 in a flat plate head 38 on the piston stem 39 so that when the gear 28 rotates the piston 35 is actuated vertically in the valve body 12 to control the several ports and passages therein normally utilized in the operation of the conditioning system. Accordingly, the piston 35 is actuated only when the gear 28 is activated by the timer mechanism described.

However, the regeneration cycle may be started manually by actuating the gear 28 from the face of the timer control 13 by means of a hand control knob 40. This will rotate the gear 28 directly and thus actuate the operating piston 35. The drive gear 22 includes a one way clutch (not shown) which enables the gear 28 to be rotated manually without affecting the normal operation of the motor 20 and driving mechanism so that the manual regeneration can be established without any effect on the normal operation of the system which will continue to operate automatically in accordance with the timer control mechanism 13 when the manual operation is completed.

The piston 35 is operative in the valve housing 12 through a plurality of spacer rings 41 stacked in the valve housing 12 within the inner bore 42 and separated by sealing rings 43 disposed between all of the rings 41 and between the bottom wall 44 of the housing and the top of the chamber formed within the bore 42 as defined by the plate 16. The sealing rings 43 are formed from a rubber compound for accommodating the sealing pressures required to be applied for compressing the seal rings and thus preventing any leakage between the rings 41 and the rings 43 where the rings 41 seat against the seal rings. The rings 43 might be made from a suitable synthetic if prefered.

It should be noted that the rings 41 are formed in two parts for simplification during manufacture and comprising an upper circular member 44 and a bottom circular member 45, formed with a plurality of integral upstanding pins 46 equally spaced around the member and engaging the underside of the upper member 44 with a snap fit so that, after manufacture as separate articles they may be heat bonded together to provide a unitary ring assembly for insertion into the bore 42 in alternate relation with the seal rings 43. The rings 41 are made from a suitable plastic material both for economy of manufacture and for ease of assembly of the two parts.

The entire housing 13 for the softener valve is made from a suitable plastic material also, but the piston 35, which is hollow, is comprised of metal, such as bronze, and is provided with a plurality of lands 47 with channels 48 therebetween to provide communication between the various ports in the softener valve as the piston is shifted vertically between its operative positions during normal operation. The piston is connected with the rod, or stem 39 by a metal pin 49 against which a hollow securing member 50 seats when screwed into the top end of the piston.

The piston thus is open at both top and bottom ends for the flow of water therethrough as dictated by system operations. The member 50 is plastic, the stem 39 is metal and the head plate 38 is of metal, the motor 20 of course is fabricated from metal parts, but to a major extent the parts of the softener valve 12, the timer control 13, including the various driving gears are all made from plastic materials. The cap member 51 closing off the top of the piston chamber also is made from a plastic material and prevents the escape of any water circulating in and around the piston 35.

An important feature of the softener valve assembly 12 is the provision of a separate brine valve module 55 assembled to the valve housing 12 and secured by two screws 56 which also secure an injector cover plate 47 to the body 55. The brine valve comprises an injector and is actuated by a cam 58 on a wheel 59 in the control housing 13 and which is rotated by the gear 28. The cam 58, when the wheel 59 is operated by the gear 28 engages the brine valve 60 as it reaches that position to depress the valve against the resistance of the brine valve spring 61 and thus move the brine valve away from the seat 62 (see FIG. 6).

The capacity of the brine valve may be varied to adapt the unit to systems of different sizes and capacities. An interchangeable series of ports is provided which have different size openings for use of selected ports in a given system to provide the flow capacities desired. An injector set 63 is provided that can be varied as to size in accordance with the capacity of the system in which the softener valve 12 is used. An injector screen 64 is provided in this section of the brine valve behind the cover plate 57. An interchangeable port member 65 is provided in the passage 67 secured by a collar member 66 threaded into the passage 67 and a similar interchangeable port member 68 is provided in the brine line and this latter port member is secured in the fitting 69.

Thus, the brine valve module 55 may vary to suit any system having the capacity for a selected installation and accordingly the softener valve 12 may be assembled to include a brine valve adaptable as to size and capacity in accordance with the particular system with which it is to be used. The brine valve, as actuated by the timer control member 58, will function to control the flow path through the several ports and passages in accordance with the conditions encountered in the normal operation of the conditioning system with which it is associated.

Inlet and outlet fittings 70 and 71 are flexibly mounted to the softener valve for connection with a household plumbing system without imposing undue strain, or stress, on the plastic structure of the housing 12. These fittings 70 and 71, as best shown in FIG. 8, fit into inlet and outlet openings in the valve body 12 and each fitting has an O-ring 72 about the portion extending into the valve body which not only acts as a seal but permits some movement, or flexibility, of the fitting in the valve body. A similar O-ring 73 is disposed about each fitting 70 an 71 adjacent to its outwardly extending portion and these O-rings provide sealing means and flexibility with respect to a supply fitting 74 which has a slip fit with the fittings 70 and 71 over the O-rings 73.

Thus, the fittings 70 and 71 have some capability for relative movement with respect to the valve body 12 and in relation to the supply fitting 74 and this flexibility is maintained by the fastening means utilized to hold the supply fitting in operative relation to the fixtures 70 and 71 and the latter fittings in operative relation to their mounting in the plastic valve body 12. The valve body has a projecting lug 75 at each side and the supply fitting 74 has similar laterally projecting lugs 76 and these lugs provide the means for retaining the fittings 70 and 71 and the supply fitting 74 in properly aligned relationship with the inlet and outlet in the valve body 12 while allowing the flexibility of some movement afforded by the O-rings 72 and 73. A clamp member 77 at each side holds the fittings in operative relationship without binding, or exerting any stress on the parts. The clamps 77 are each secured to the fitting 70 or 71 as the case may be, by a small bolt, or screw 78.

From the foregoing, it will be seen that a universally adaptable softener valve assembly for a water conditioning system has been provided wherein the valve may be easily modified, or adjusted, to provide capacities for use with any conditioning system and operating in conjunction with an associated operation timing control that activates the softener valve and the related brine valve and wherein a major part of the valve and timer assembly are made from plastic materials and a flexible attachment is provided for connection with an existing household plumbing system in a manner whereby any damage to the plastic parts, or undue stress thereon, is avoided.

The softener valve provides a separate brine valve assembled therewith which is made from plastic but may be assembled with a plastic softener valve body or assembled with one made from metal, such as brass, or bronze. The assembled softener valve incorporates internally all of the passages and ports necessary to the operation of the water conditioning system whereby the need for any external plumbing is eliminated. The timer control simplifies this operation by eliminating the multiplicity of parts heretofore used to start the regeneration cycle and provides a direct operative relationship with a fixedly mounted drive motor. The improvements incorporated herein have been found to simplify the operability of a water conditioning system of the type contemplated herein.

What is claimed is:

1. In a water conditioning system having a timer control and an associated softener valve operatively associated with a treatment tank and a brine tank with piping connections for water supply and brine injection and soft water distribution, the improvement comprising a rigidly mounted motor driving a piston and a timer control, a skipper wheel in the timer control, an operating connection between the driving motor and the skipper wheel for initiating operation of the conditioning system, said softener having a unitary brine valve module incorporating an injector and a brine valve, a plurality of spacer rings provided in the softener valve and said piston operating in said rings, said spacer rings each made of a plastic material in two parts comprising vertically spaced upper and lower elements separated by a plurality of pins integral with one such element and heat bonded to the other element, and seal rings between the adjacent spacer rings.

2. The improvements in a water conditioning system as set forth in claim 1 wherein said softener valve and assembled brine valve incorporate internally the ports and water passages required for operation of said system.

3. The improvements in a water conditioning system as set forth in claim 1 wherein said softener valve is made substantially from plastic material and having water inlet and outlet openings, and a plastic fitting in each of said openings for connection with rigid plumbing lines, said fittings having an O-ring between each of said fittings and said inlet and outlet openings and an O-ring between each of said fittings and said plumbing lines affording flexible connections with said lines to avoid damage to the plastic valve structure.

* * * * *